Dec. 15, 1970   M. A. PAHLAVAN   3,548,254
DISPLAY APPARATUS

Filed April 12, 1967   4 Sheets-Sheet 1

*INVENTOR.*
MARCEL A. PAHLAVAN
BY *Lindenberg & Freilich*

ATTORNEYS

Dec. 15, 1970     M. A. PAHLAVAN     3,548,254

DISPLAY APPARATUS

Filed April 12, 1967     4 Sheets-Sheet 4

*INVENTOR.*
MARCEL A. PAHLAVAN
BY *Lindenberg & Freilich*

ATTORNEYS

United States Patent Office 3,548,254
Patented Dec. 15, 1970

3,548,254
DISPLAY APPARATUS
Marcel A. Pahlavan, Los Angeles, Calif., assignor to Aerospace Products Research Corporation, Santa Monica, Calif., a corporation of California
Filed Apr. 12, 1967, Ser. No. 630,268
Int. Cl. H05b 33/14; H01l 1/22
U.S. Cl. 315—169          20 Claims

ABSTRACT OF THE DISCLOSURE

A display device useful for displaying desired patterns in response to electrical signals. The device in one form comprises a stack of individual display modules, each of which constitutes a flat thin structure or substrate carrying a plurality of flat aligned contiguous illuminable elements, e.g. along an edge surface thereof. Cavities are defined within the substrate and circuit components are contained within the cavities within the profile of the substrate. Connections to the illuminable elements are made by flat conductive paths supported on the substrate.

BACKGROUND OF THE INVENTION

(1) Field of the invention

This invention relates generally to apparatus for displaying information in response to electrical signals.

(2) Description of the prior art

Innumerable applications exist for devices capable of visually displaying information in response to applied electrical signals. For example, cathode ray tubes are employed in many diversified applications including home television receivers, computer input/output consoles, etc. As is well known, the cathode ray tube is caused to visually present selected patterns by deflecting an electron beam over the tube face to describe the desired pattern. The beam deflection is controlled by applied electrical deflection signals. Wherever the beam strikes the face, a spot of illumination is created which persists for a short time. Inasmuch as the tube face can be considered homogeneous, the spot of illumination can be created at any of an infinite number of different points on the face.

In another class of display devices, a great number of discrete elements are closely packed with means being provided for selectively energizing each element to create a spot of illumination. By proper selection, any desired pattern or symbol can be displayed. The discrete elements can comprise any of innumerable devices such as neon bulbs, electroluminescent elements, etc.

It will of course be apparent that in order for a discrete spot display device to have a high resolution, it is essential that the display elements be packed as densely as possible. As packing density is increased however, numerous fabrication and design difficulties are introduced. One of the objects of the present invention is to provide a display device implementation which yields a very high display element density and thus a very high resolution.

As previously pointed out, the illumination spots created in a conventional cathode ray tube persist for only a short time and need to be periodically refreshed from some storage means in order to maintain a display pattern. Similarly, all discrete spot display devices require some information storage means in order to maintain a display pattern. An additional object of the present invention is to provide a display device implementation in which the information storage means comprises an integral part of the display device structure.

SUMMARY OF THE INVENTION

The present invention is directed to a reliable and relatively inexpensive display device which is capable of presenting very high resolution display patterns comprised of discrete spots of illumination.

In accordance with a significant feature of the present invention, display devices of virtually any size can be easily fabricated by properly physically organizing a plurality of substantially identical display modules. Moreover, in accordance with a further feature of the invention, an assembled display device can be easily disassembled to, for example, repair or replace a faulty module.

In accordance with a further feature of the present invention, each physical display module lends itself to easy fabrication by true mass and continuous production techniques.

Briefly, display modules provided in accordance with the present invention comprise substantially thin flat structures or substrates carrying means for selectively illuminating unit areas along an edge surface of the substrate with control and storage means being physically contained within the profile of the substrate.

Thus, each display module can comprise a substrate having a plurality of individually illuminable display elements attached to an edge surface thereof. By stacking several display modules, a matrix of display elements is formed and by illuminating selected elements, any desired pattern can be created.

One preferred method of fabricating a display module structure in accordance with the invention comprises selectively etching a thermally conductive and electrically inert substrate to form cavities therein into which circuit components are placed. Preferably, the desired circuit components, which can include display elements (e.g. electroluminescent), storage elements (e.g. ferroelectric), and control elements (e.g. diode) are formed of bulk material. Interconnections between the components can be made by conductors deposited on the substrate surface.

The basic concept of the invention can be extended to incorporate several other features which may be desirable in certain applications. Thus, in order to provide cooling to permit high temperature operation, bulk thermoelectric material can be attached to the substrate. In accordance with another feature of the invention, a full color display can be provided by stacking modules in sequence respectively carrying illuminable elements of different colors. Additionally, interactive displays can be formed by associating an energy responsive element with each illuminable unit area defined along the edge surfaces of the substrates.

DESCRIPTION OF THE PREFERRED EMBODIMENTS

Figure 1:
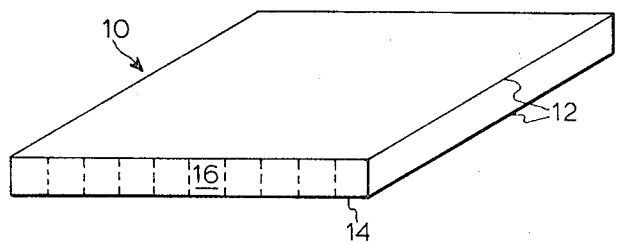
FIG. 1 is a schematic perspective view of a typical display module in accordance with the present invention.

Attention is now called to FIG. 1 of the drawings which illustrates a schematic perspective view of a typical display module 10 constructed in accordance with the present invention. The display module 10 comprises a flat relatively thin structure having top and bottom substantially parallel surfaces 12 and an edge surface 14 extending therebetween. As will be seen hereinafter, the invention contemplates providing means for selectively illuminating a plurality of unit areas 16 along the edge surface 14 with circuit components for controlling the selective illumination being housed between the surfaces 12 of the module 10. Although ten areas 16 are illustrated in FIG. 1, it will be appreciated that this is exemplary only and virtually any number can be provided.

Figure 2:
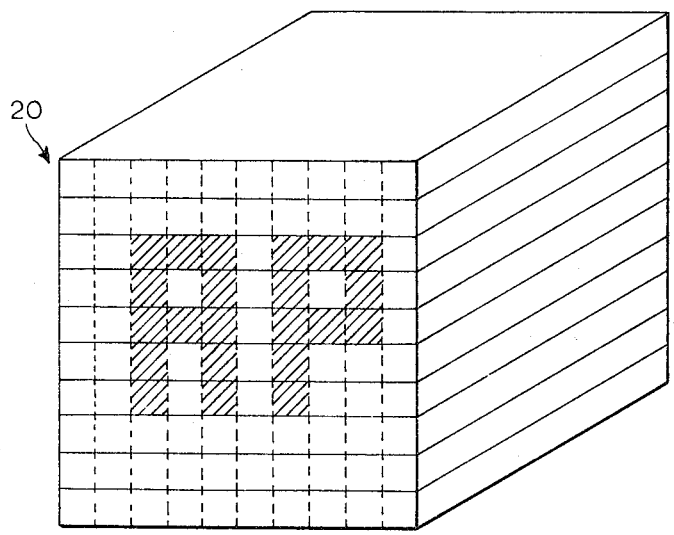
FIG. 2 is a perspective view of a display device formed of a plurality of modules as illustrated in FIG. 1 and showing a typical display pattern presented thereby.

The module 10 as illustrated in FIG. 1 is useful for displaying one-dimensional information. Thus, it can be utilized to visually represent a bargraph for example or a pointer which can appear to move relative to a fixed scale. On the other hand, a plurality of display modules 10 of the type shown in FIG. 1 can be utilized in combination, as shown in FIG. 2, to form a display device 18 capable of displaying two-dimensional patterns. Thus, as shown in FIG. 2, a matrix of ten columns by ten rows of display areas is formed by providing a stack of ten display modules 10. FIG. 2 illustrates a typical display pattern which can be presented by the display device 18 by illuminating selected areas 16.

It will of course be appreciated that the size of display device 20 of FIG. 2 is exemplary only and that virtually any size display matrix can be provided in accordance with the present invention. The size of each area 16 will of course determine the resolution of the resulting display and in order to achieve as high a resolution as possible, the areas 16 should be as small as possible. As the size of the areas 16 are decreased however, circuit and structural complexities are introduced which of course increase cost. In a typical embodiment of the invention, it is contemplated that the areas 16 be on the order of ten to thirty mils square. In accordance with the preferred embodiment of the invention, the illuminable areas 16 are defined by flat electroluminescent elements adhered to the edge surface 14.

Figure 3:
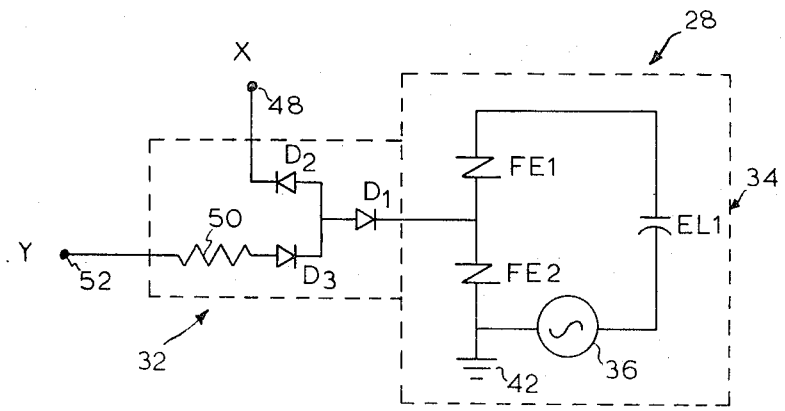
FIG. 3 is a circuit diagram illustrating a preferred circuit which can be utilized to control the energization of an electroluminescent element.

Attention is now called to FIG. 3 which illustrates a preferred circuit arrangement 28 for establishing and maintaining the state of a single electroluminescent element EL1. The circuit of FIG. 3 can be considered as being comprised of a control or addressing portion 32 and a storage portion 34. The electroluminescent element EL1 is illustrated as forming part of the storage portion 34.

The storage portion 34 of the circuit 28 includes an alternating current source 36 providing an output voltage sufficiently high to energize the electroluminescent element EL1. As illustrated in FIG. 3, the right side of source 36 is connected to a first terminal of the element EL1. The second terminal of the element EL1 is connected back to the left side of source 36 through serially connected ferroelectric devices FE1 and FE2. Additionally, the left side of source 36 is connected to a direct current ground 42.

The control portion 32 of the circuit of FIG. 3 is connected to the junction 44 between the ferroelectric devices FE1 and FE2 to control the state of device FE2. As will be explained in detail hereinafter, the ferroelectric device can be switched to either a blocked or unblocked state. When the ferroelectric device FE2 defines an unblocked state, the voltage provided by source 36 is applied across the electroluminescent element EL1 to cause it to glow. On the other hand, when the ferroelectric device defines a blocked state, the voltage from source 36 is blocked and thus the electroluminescent element EL1 remains dark.

The control portion 32 of circuit 28 is comprised of a first isolating diode D1 whose cathode is connected to the previously mentioned junction 44. The anode of diode D1 is in turn respectively connected to the anode of isolating diode D2 and the cathode of isolating diode D3. The cathode of diode D2 is connected to a first or X selection terminal 48 and the anode of diode D3 is connected through an impedance 50 to a second or Y selection terminal 52.

Figure 4:
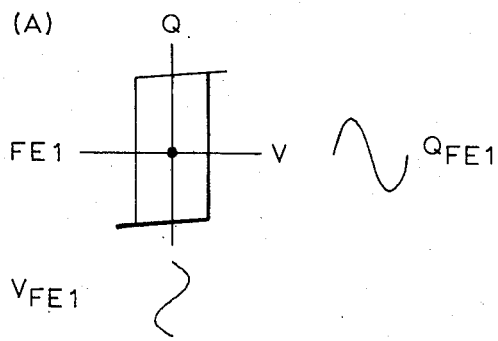
FIG. 4 is a diagram illustrating the characteristics of typical ferroelectric elements showing how they can be operated in the circuit of FIG. 3 in order to illuminate the electroluminescent element thereof.
Figure 4:
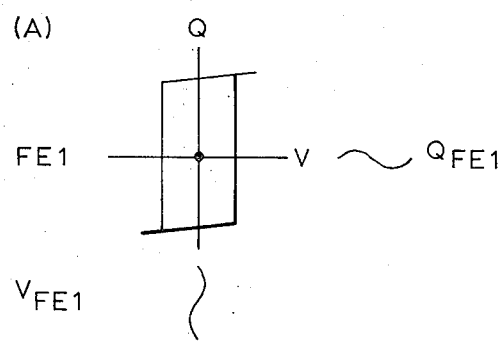
Figure 4:
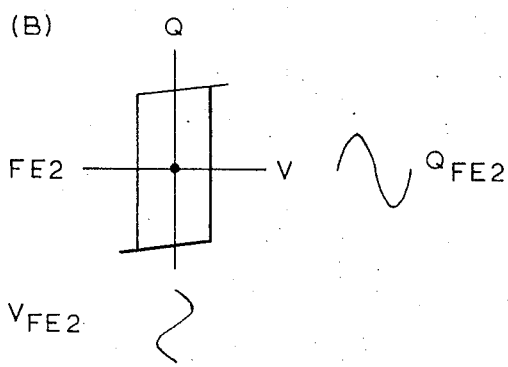
Figure 5:
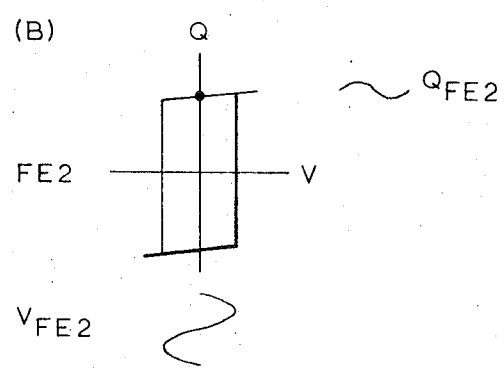
FIG. 5 is a circuit diagram illustrating how the ferroelectric elements of FIG. 3 are operated in order not to illuminate the electroluminescent element thereof.

In order to understand the operation of the circuit of FIG. 3, attention is first called to FIGS. 4 and 5 which present hysteresis characteristics of substantially ideal ferroelectric devices. As is appreciated by those skilled in the art, ferroelectric devices can be analogized to ferromagnetic devices, recognizing however that the ferroelectric devices have charge remanence rather than magnetic remanence. FIGS. 4(A) and 4(B) respectively illustrate the ferroelectric devices FE1 and FE2 both defining unblocked states; i.e. having no charge remanence. In this situation, the voltage provided by source 36 [FIG. 4(C)] divides equally across the devices FE1 and FE2. The voltage $V_{FE1}$ across device FE1 produces the charge transfer $Q_{FE1}$ and the voltage across device FE2 produces the charge transfer $Q_{FE2}$ and as a consequence sufficient current flows through the electroluminescent element EL1 to illuminate it. If, on the other hand, the ferroelectric device FE2 is switched to a blocked state [FIG. 5(B)], substantially the entire source voltage [FIG. 5(C)] will appear thereacross. However, as can be seen from FIG. 5(B), the voltage $V_{FE2}$ will not produce a very large charge transfer $Q_{FE2}$ since the voltage will merely move the charge residual back and forth along the upper line of the hysteresis characteristic shown in FIG. 5(B). As a consequence, insufficient current will flow through the electroluminescent element to permit it to glow. Thus, it should be appreciated that the element EL1 can be controlled by controlling the polarization or remanence of one of the two ferroelectric devices, e.g. FE2. Control portion 32 is provided to control the state of device FE2 in response to signals applied to terminals 48 and 52.

Figure 6:
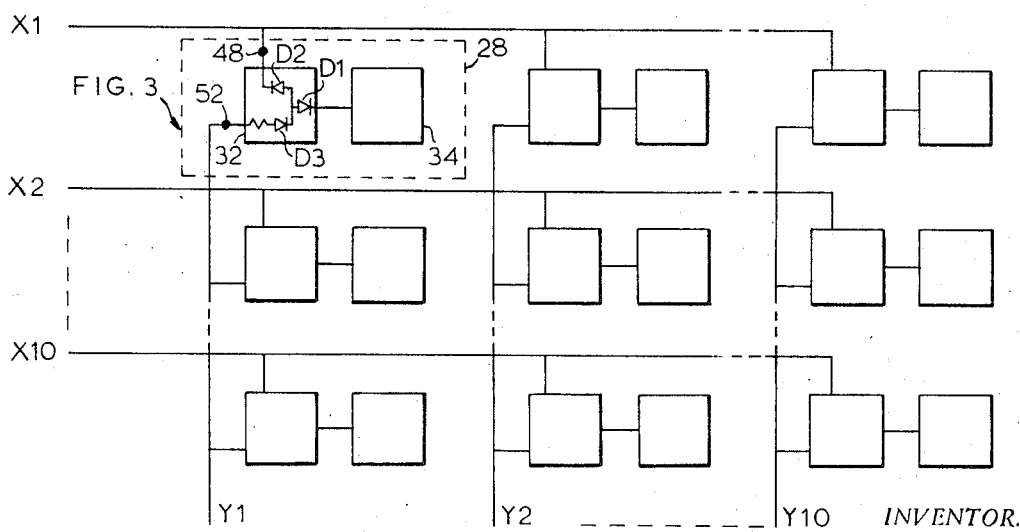
FIG. 6 is a schematic diagram illustrating the manner in which several circuits of the type shown in FIG. 3 can be interconnected in a matrix arrangement to form a display device.

In order for the circuit of FIG. 3 to be useful to control illuminable elements 16 in a two-dimensional display device 18 as shown in FIG. 2, it is important that it be amenable to a matrix system of selection as shown in FIG. 6. Thus, a common X conductor is connected to the input terminal 48 of all ten of the circuits in each row of the matrix of FIG. 6 which circuits respectively include all ten of the illuminable elements shown in the corresponding row of the display device 20 of FIG. 2. Similarly, terminals 52 of circuits 28 containing illuminable elements disposed in a common column of display device 20 are interconnected by a common Y conductor.

Prior to considering how the circuits 28 contained in the matrix of FIG. 6 are controlled to present desired display patterns, let it be assumed that the ferroelectric devices FE2 in each of the circuits 28 are selected so that they are switched from the state of FIG. 4(B) to the state of FIG. 5(B) in response to the application thereacross of a positive 100 volt potential. Let it further be assumed that they can be switched back from the state shown in FIG. 5(B) to the state shown in FIG. 4(B) by the application of a negative potential which drains the remanent charge off. Further, let it be assumed that approximately 250 volts are required to break down each diode D1 in a reverse direction.

With the foregoing considerations in mi d, consider initially that all of the ferroelectric devices of the matrix of FIG. 6 are unblocked, meaning that all of the electroluminescent elements EL1 thereof are "on" or illuminated. Now assume that it is desired to write or in other words darken selected electroluminescent elements. Writing is accomplished by operating upon the matrix rows of FIG. 6 in sequence. Thus, consider that it is desired to darken the element at row 1, column 1 of the display device while permitting the other elements of row 1 to remain light. In order to do this, a positive potential is applied to row conductor X1 connected to terminal 48 of all circuits 28 in row 1. A positive potential is also applied to conductor Y1 and a negative potential is applied to all of the other Y conductors. As a consequence, the ferroelectric device FE2 of the circuit 28 of matrix column 1, row 1 will be switched from the state of FIG. 4(B) to the state of FIG. 5(B) to thus darken the illuminable element connected thereto. The ferroelectric elements FE2 of the circuits of the other columns of row 1 will not be switched and the illuminable elements connected thereto will remain light.

In order to erase or switch a darkened electroluminescent element to a light state, it is necessary to dissipate the charge in the ferroelectric device FE2 associated therewith. Assuming it is now desired to lighten the element of row 1, column 1, a zero volt potential can be applied to the row conductor X1 and a —300 volt DC potential can be applied to the column conductor Y1. This action will break down the diode D1 of row 1, column 1 circuit 28 in reverse and permit the ferroelectric device FE2 thereof to discharge therethrough, thus illuminating the electroluminescent element connected thereto. None of the other illuminable elements will be affected. Accordingly, it should be appreciated that by having the capability to selectively darken or lighten any of the electroluminescent elements in the circuit matrix of FIG. 6, any desired display pattern, e.g. as shown in FIG. 2, can be created.

Figure 7:
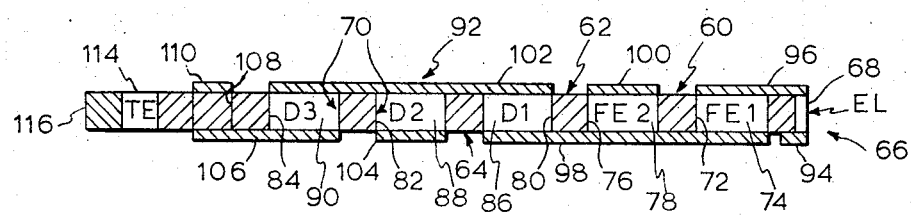
FIG. 7 is a schematic sectional view illustrating a typical display module in accordance with the present invention.

Attention is now called to FIG. 7 which illustrates a schematic cross-sectional view taken through a typical display module 10 illustrating a single illuminable element together with the storage and control circuitry required therefor. The implementation of FIG. 7 comprises a flat thin structure or substrate 60 having flat top and bottom surfaces 62 and 64 and an edge surface 66 extending therebetween. A flat piece of electroluminescent material 68 is secured to the edge surface 66. Cavities 70 are defined in the substrate 60 and circuit components (forming the circuit of FIG. 3) are disposed therein. Preferably, the circuit components are formed of bulk material having the desired electrical characteristics.

More particularly, a cavity 72 is provided for receiving ferroelectric material 74. Similarly, cavity 76 receives ferroelectric material 78. Cavities 80, 82, and 84, respectively, receive diode material 86, 88, and 90 therein. Interconnections between the various components are made preferably by flat conductive paths 92 supported on the substrate. Thus, path 94 corresponds to the connection between the electroluminescent material and the alternating current source shown in FIG. 3. Path 96 connects the electroluminescent material to the ferroelectric material 74 (FE1 of FIG. 3). Path 98 electrically corresponds to junction 44 of FIG. 3. Path 100 is intended to be connected to a direct current ground and to one side of the alternating current source. Conductive path 102 corresponds to the junction between diodes D1, D2, and D3 of FIG. 3. Conductive paths 104 and 106 respectively correspond to terminals 48 and 52 of FIG. 3.

It will be appreciated from FIGS. 3 and 6 that some of the conductive paths referred to in FIG. 7 are unique to a particular illuminable element while some are common to all of the elements on a display module 10.

Figure 8:
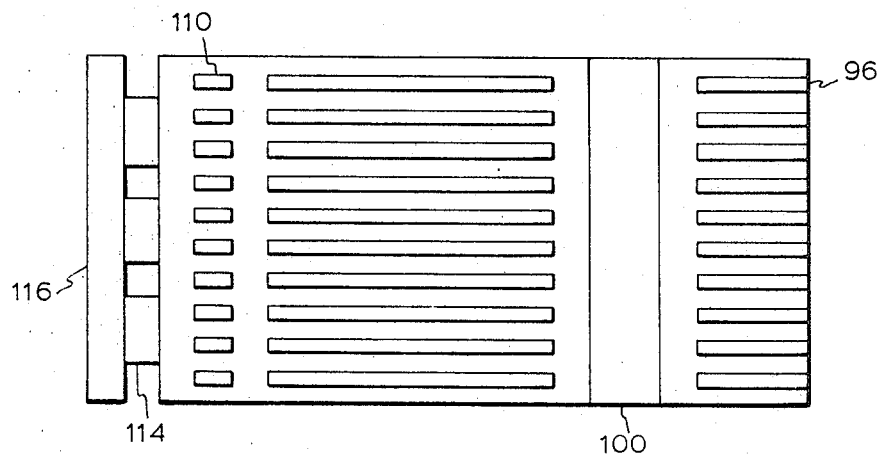
FIG. 8 is a plan view illustrating the top surface of the module of FIG. 7.
Figure 9:
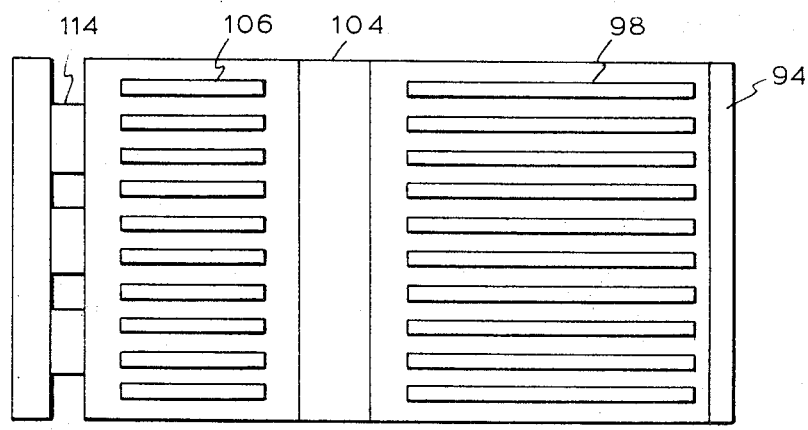
FIG. 9 is a plan view illustrating the bottom surface of the module of FIG. 7.

FIGS. 8 and 9 respectively illustrate top and bottom plan views of the implementation of FIG. 7 showing the manner in which the conductive paths may be typically arranged. Note in FIG. 8 that the paths 96 and 102 are all unique to an individual illuminable element. On the other hand, path 100 is common to all of the elements and thus can bridge the ferroelectric devices FE2 of the circuits coupled to all of the illuminable elements. It will be noted in FIG. 9, illustrating the bottom surface of the implementation of FIG. 7, that the paths 94 and 104 are common to all of the illuminable elements while the paths 106 and 98 are each unique to a different illuminable element.

Display module implementations of the type represented in FIGS. 7–9 are intended to be stacked for certain applications as illustrated in FIG. 2. In order to do this, of course, it is necessary that certain interconnections be provided between the stacked display modules. For example only, it is necessary to connect each Y conductor as shown in FIG. 6 to every module in a stack. On the other hand, it is essential that portions of the conductive paths on the bottom surface of one module do not electrically contact portions of the conductive paths on the top surface of an adjacent module. Several techniques are suitable for accomplishing this. In the technique illustrated in FIG. 7, the conductive path 106 which may be interconnected with all other stacked modules is connected to a conductive path 108 extending through a hole in the structure 60 to a conductive pad 110 on the top surface of the structure 60. As is illustrated in FIG. 7, the conductive pad 110 is built up to be higher than the conductive paths which are not to be interconnected. Thus, when a plurality of display modules are stacked and strapped together, the built-up pads will be in electrical contact while the other conductive paths will not. Many alternative schemes are of course possible. For example, an insulating film could be selectively applied to all of the conductive paths which should not contact paths on other modules while those that should contact paths on other modules can be left uninsulated. In accordance with a further technique, the conductive paths to be confined to a single module can be disposed within channels extending into the substrate 60 with only the paths to be interconnected between modules being formed on the top and bottom substrate surfaces.

Substrates of many different materials can be utilized in accordance with the invention. Certain characteristics of the material are however important. Initially, it is of course important that the substrate be electrically insulative in order to prevent shorting between the circuit components carried thereby. Additionally, inasmuch as it has been found that excessive heat can cause deterioration of the electroluminescent and other elements, it is desirable that the substrate material be a good heat conductor. In order to further reduce the likelihood of excessive heating, in accordance with a further aspect of the invention, pieces 114 of bulk thermoelectric material (e.g. bismuth telluride alloys) can be attached to the substrate 60 on one side thereof. The second sides of pieces 114 are in contact with a heat sink bar 116. Thus, the thermoelectric elements absorb heat from the substrate 60 and tend to equalize its temperature to that of the bar 116. The thermoelectric elements can be electronically energized if desired to effect even greater cooling.

Figure 10:
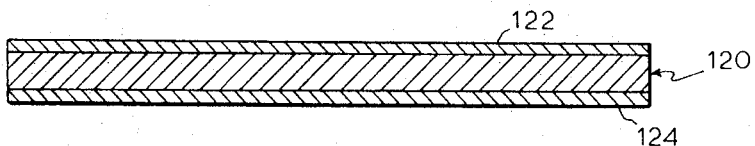
FIG. 10 illustrates the steps of an exemplary method for fabricating the module of FIG. 7.
Figure 10:
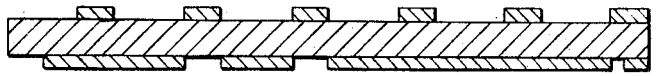
Figure 10:
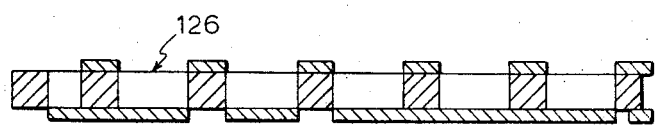
Figure 10:
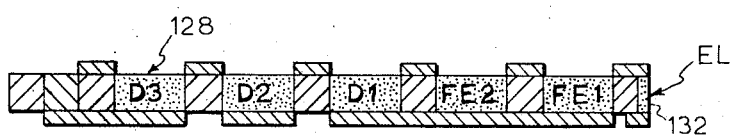
Figure 10:
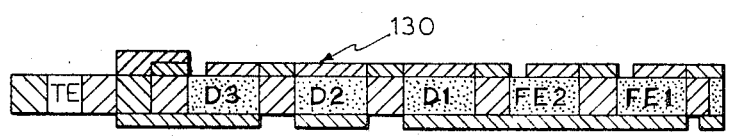

Various techniques can be employed to form the structure of FIGS. 7–9. For example, the substrate could be fabricated on a mass or continuous production basis by stamping or casting. By so doing, modules of any desired length would be available merely by effectively slicing the module to the desired dimension. An alternative technique of fabricating the implementation shown in FIGS. 7–9 as illustrated in FIG. 10. Therein, a substrate 120 is provided which has a conductive film 122 and 124 adhered to opposite surfaces thereof [FIG.

10(A)]. In the initial fabrication step, a properly exposed photoresist is used to define a desired conductor pattern [FIG. 10(B)] on the conductive films 122 and 124 and then the films are etched. Subsequently, the substrate can be selectively etched to form cavities 126 therein as shown in FIG. 10(C). FIG. 10(D) illustrates the cavities filled with the bulk material 128 comprising the electroluminescent material, ferroelectric material and diode material. Thereafter, the conductive patterns on the surfaces of the substrate 120 are completed by selective deposition of silver 130, e.g.

Various techniques are available for applying the electroluminescent material 32 to the edge of the substrate 120 as required by the implementation of FIG. 10. For example, a strip of electroluminescent material can be utilized and merely adhered against the edge surface along the length thereof. Although the strip can be physically segmented, this is normally unnecessary inasmuch as the conductive paths 96 (FIG. 8) will act to illuminate only portions of the electroluminescent material immediately proximate thereto. It has also been found that the electroluminescent material can be sprayed against the edge surface of the substrate 120.

Figure 11:
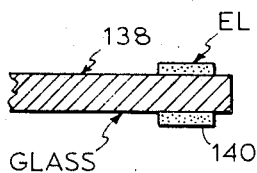
FIG. 11 is a fragmentary sectional view illustrating a portion of an alternate display module in accordance with the invention.

Attention is now called to FIG. 11 which illustrates an alternative configuration for selectively illuminating unit areas on the edge 136 of a substrate 138. The substrate 138 is non-opaque, e.g. glass, and electroluminescent elements 140 can be supported on one or both surfaces thereof adjacent the edge surface 136. The circuitry (e.g. FIG. 3) required to selectively energize the elements 140 is preferably supported within the profile of the substrate 138 in the manner of FIG. 7. Illumination of the element 140 causes reflections in the substrate sufficient to illuminate a unit area of edge surface 136.

Figure 12:
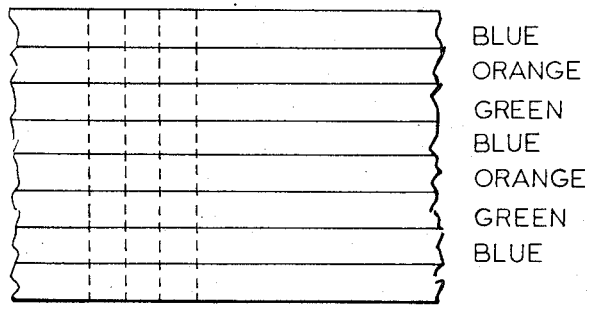
FIG. 12 is a schematic illustration showing the manner in which display modules of the present invention can be employed to provide a full color display.

Attention is now called to FIG. 12 which schematically illustrates a further embodiment of the invention for providing full color displays. In the embodiment of FIG. 12, display modules carrying different colors are arranged in the stack in a predetermined sequence. By properly selecting the display elements to be illuminated, full color displays can be presented.

Figure 13:
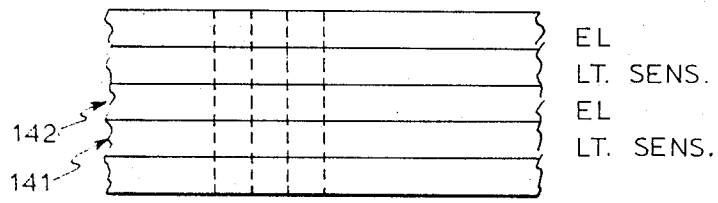
FIG. 13 is a schematic illustration showing the manner in which display modules in accordance with the invention can be utilized to provide an interactive display.

In accordance with a further embodiment of the invention as shown in FIG. 13, an interactive display can be provided. For example, assume that the display is being utilized as part of a computer input/output console for presenting information to an operator to which he can respond by designating a point on the surface of the display matrix. In order to provide such a device, sensor modules 141, similar to the display modules already described, can be interleaved in a stack of display modules 142. The sensor modules, in lieu of having illuminable elements mounted on the edge surface thereof, are provided with energy responsive means such as light sensitive elements. By utilizing a small light pen for example, the operator can thus designate a particular portion of the display surface. Such a capability may be useful in interactive computer systems to enable the operator to designate to the computer particular portions of a presented display pattern. Alternatively, the illuminable and sensing elements can be alternately arranged along a common edge surface of the same display module.

From the foregoing, it should be appreciated that a reliable relatively inexpensive solid state display apparatus has been disclosed herein useful for presenting both one- and two-dimensional display patterns in response to applied electrical signals. Embodiments of the invention are preferably modular in construction, thereby enabling display devices of virtually any size to be fabricated and easily repaired. Moreover, embodiments of the invention lend themselves to easy mass and continuous fabrication, thus enabling them to be provided in large quantities at low costs.

Although specific embodiments of the invention have been disclosed herein, it is recognized that various other embodiments will readily occur to those skilled in the art. For example only, it is appreciated that circuit arrangements considerably different from that shown in FIG. 3 could be employed. Thus, integrated circuit switching and storage techniques could be used in lieu of the ferroelectric devices.

What is claimed is:
1. A display module comprising:
   a substrate having first and second substantially parallel surfaces and an edge surface oriented substantially perpendicular to said first and second surfaces and extending therebetween;
   a flat illuminable means supported against said edge surface; and
   conductor means carried by said substrate and in electrical contact with said flat illuminable means.
2. The display module of claim 1 including:
   a cavity defined in said substrate;
   a circuit component disposed in said cavity; and wherein
   said conductor means includes flat conductive path means carried by said substrate interconnecting said circuit component and said illuminable means.
3. The display module of claim 1 wherein said circuit component is formed of bulk material deposited in said cavity.
4. The display module of claim 1 wherein said substrate is formed of a material having good heat conduction and electrical insulation characteristics.
5. The display module of claim 1 wherein said illuminable means is comprised of electroluminescent material.
6. The display module of claim 1 including thermoelectric material in contact with said substrate.
7. Apparatus for presenting visual displays of one dimensional information comprising:
   a substrate having first and second substantially parallel surfaces and an edge surface oriented substantially perpendicular to said first and second surfaces and extending therebetween;
   a flat strip of illuminable material extending along and supported adjacent to said edge surface; and
   a plurality of electrically conductive paths carried by said substrate each in electrical contact with a different portion of said illuminable material.
8. The apparatus of claim 7 wherein said flat strip of illuminable material is segmented to define a plurality of individual illuminable elements; and wherein
   each of said electrically conductive paths is in contact with a different one of said elements.
9. The apparatus of claim 7 wherein a plurality of cavities are defined in said substrate;
   material having predetermined electrical characteristics fully disposed in each of said cavities; and
   means carried by said substrate respectively electrically connecting each of said electrically conductive paths to the material in a different one of said cavities.
10. The apparatus of claim 7 wherein each of said electrically conductive paths is defined by a flat layer of electrically conductive material supported adjacent to one surface of said substrate.
11. The apparatus of claim 7 wherein said substrate is comprised of an electrically insulative material having good heat conduction characteristics.
12. The display module of claim 7 including thermoelectric material in contact with said substrate.
13. The apparatus of claim 7 wherein said illuminable material constitutes electroluminescent material.
14. Apparatus for presenting visual displays of one-dimensional information comprising:
   a substrate having first and second substantially parallel surfaces and an edge surface oriented substantially perpendicular to said first and second surfaces and extending therebetween;
   a plurality of flat illuminable elements supported adjacent said edge surface;

a plurality of flat energy responsive elements supported adjacent said edge surface; and conductive path means carried by said substrate and electrically contacting said illuminable and energy responsive elements thereon.

15. Apparatus for presenting two-dimensional displays comprising:

a plurality of substrates, each having top and bottom substantially parallel surfaces and an edge surface oriented substantially perpendicular to said top and bottom surfaces and extending therebetween;

means supporting said substrates in a stack configuration with said edge surfaces being disposed in a substantially common plane;

a plurality of strips of illuminable material, each strip extending along and supported adjacent to a different one of said edge surfaces;

a plurality of electrically conductive paths supported on each of said substrates, each of said paths electrically contacting a different portion of the strip supported adjacent to the edge surface of the same substrate.

16. The apparatus of claim 15 including a plurality of circuit means carried by each of said substrates;

means carried by each of said substrates electrically connecting each of said circuit means carried thereby to a different one of said electrically conductive paths supported thereon;

first selection means interconnecting all of the circuit means on each substrate; and second selection means interconnecting corresponding circuit means from each of said substrates.

17. The apparatus of claim 15 wherein different ones of said strips of illuminable material are of different colors; and wherein said substrates are arranged in said stack configuration with said strips arranged in a predetermined color sequence.

18. The apparatus of claim 15 including a plurality of flat structures of substantially the same size as said substrates, each of said flat structures having top and bottom substantially parallel surfaces and an edge surface extending therebetween;

means supporting each of said flat structures in said stack configuration between a pair of adjacent substrates with the edge surfaces thereof being disposed in said substantially common plane; and a plurality of flat energy responsive elements supported adjacent said edge surfaces of each of said structures.

19. Apparatus for presenting two-dimensional displays comprising:

a plurality of substrates, each having top and bottom substantially parallel surfaces and an edge surface oriented substantially perpendicular to said top and bottom surfaces and extending therebetween;

means supporting said substrates in a stack configuration with said edge surfaces being disposed in a substantially common plane;

a plurality of flat illuminable elements supported adjacent each of said edge surfaces;

a plurality of flat energy responsive elements supported adjacent each of said edge surfaces; and conductive path means carried by each of said substrates and electrically contacting said illuminable and energy responsive elements thereon.

20. A circuit arrangement comprising:

an illuminable element;

a source of alternating current potential;

first and second ferroelectric devices;

means connecting said illuminable element, said source of potential and said first and second ferroelectric devices in series; and means for controlling the charge remanent state of one of said ferroelectric devices, said means including an isolating element connected to said one ferroelectric device;

means for applying a first potential to said isolating element for conducting current in a forward direction therethrough to switch said one ferroelectric device to a first charge remanent state; and means for applying a second potential to said isolating element for breaking down said element to conduct current therethrough in a reverse direction to switch said one ferroelectric device from said first charge remanent state.

References Cited

UNITED STATES PATENTS

| | | | |
|---|---|---|---|
| 3,012,095 | 12/1961 | Skellett | 340—166 |
| 3,280,370 | 10/1966 | Nehrich, Jr. et al. | 315—169 |
| 3,328,790 | 6/1967 | Rhodes | 340—166 |
| 3,323,241 | 6/1967 | Blair et al. | 340—324 |
| 3,480,830 | 11/1969 | Horton et al. | |

ALVIN H. WARING, Primary Examiner

M. M. CURTIS, Assistant Examiner

U.S. Cl. X.R.

307—303; 313—108; 340—324